United States Patent [19]
Hirai

[11] Patent Number: 5,713,053
[45] Date of Patent: Jan. 27, 1998

[54] TTL EXPOSURE CONTROL APPARATUS IN AN INTERCHANGEABLE LENS CAMERA

[75] Inventor: Isamu Hirai, Tokyo, Japan

[73] Assignee: Asahi Kogaku Kogyo Kabushiki Kaisha, Tokyo, Japan

[21] Appl. No.: 624,119

[22] Filed: Mar. 29, 1996

[30] Foreign Application Priority Data

Mar. 31, 1995 [JP] Japan ................... 7-076307

[51] Int. Cl.⁶ ............... G03B 7/08; G03B 7/20
[52] U.S. Cl. ............... 396/92; 396/91; 396/111; 396/274
[58] Field of Search ............... 354/286, 402, 354/412, 432, 481; 396/91, 92, 111, 233, 274

[56] References Cited

U.S. PATENT DOCUMENTS

| | | | |
|---|---|---|---|
| 4,306,787 | 12/1981 | Fukuhara et al. | |
| 4,529,288 | 7/1985 | Nakai et al. | |
| 4,636,054 | 1/1987 | Saegusa | |
| 4,673,275 | 6/1987 | Nakai et al. | |
| 4,682,871 | 7/1987 | Metabi | |
| 4,812,868 | 3/1989 | Utagawa et al. | 354/402 |
| 4,912,493 | 3/1990 | Tanaka | 354/402 |
| 4,984,007 | 1/1991 | Takagi | |
| 5,012,268 | 4/1991 | Hirai | |
| 5,172,154 | 12/1992 | Katagishi et al. | 354/402 |
| 5,349,409 | 9/1994 | Kawasaki et al. | |
| 5,355,192 | 10/1994 | Kawasaki et al. | |
| 5,493,361 | 2/1996 | Sato et al. | 354/286 |

FOREIGN PATENT DOCUMENTS

| | | |
|---|---|---|
| 5-49206 | 7/1993 | Japan. |
| 1296074 | 1/1970 | United Kingdom. |
| 2106258 | 3/1982 | United Kingdom. |

OTHER PUBLICATIONS

One United Kingdom Search Report.

Primary Examiner—Safet Metjahic
Assistant Examiner—Michael Dalakis
Attorney, Agent, or Firm—Greenblum & Bernstein P.L.C.

[57] ABSTRACT

A TTL exposure control apparatus having a camera body to which different interchangeable lenses can be detachably attached is disclosed. At least one of the interchangeable lenses is an interchangeable wide-angle lens having a distortion. The wide-angle lens has a memory for storing an exposure correction value corresponding to the distortion. The camera body includes a photometering device which measures photometering data using light transmitted through the interchangeable lenses, and a photometering data correcting device for correcting the measurements by the photometering device in accordance with the exposure correction value read from the memory when the interchangeable wide-angle lens is attached to the camera body.

16 Claims, 4 Drawing Sheets

TTL EXPOSURE CONTROL APPARATUS IN AN INTERCHANGEABLE LENS CAMERA

BACKGROUND OF THE INVENTION

1. Field of the Invention

The present invention relates to a through-the-lens (TTL) exposure control apparatus in an interchangeable lens camera, and more precisely, to an exposure control apparatus in which a lens having a distortion is used as an interchangeable lens.

2. Description of Related Art

The applicant (assignee) of the present application has previously proposed an exposure control system in which a difference between an actual measurement of photometering data, obtained using light transmitted through an interchangeable lens, and an ideal value, is corrected (Japanese Examined Patent Publication No. 5-49206).

Actual photometering data measured using light transmitted through an interchangeable lens (TTL data) depends upon the characteristics of the interchangeable lens being used, for example, a focal length, a position of an exit pupil, an open F number, or a vignetting factor, etc. Hence depending upon the interchangeable lens used, there is a difference between the actual measurement of the photometering data and the ideal value. The control system proposed in JPP '206 mentioned above, addresses the correction of this difference. To this end, lens data inherent to the interchangeable lenses to be used, is stored in a ROM of each interchangeable lens. In a camera body, on the other hand, calculating formulae are stored to correct the measurement in accordance with the lens data stored. The interchangeable lens used is distinguished through a data communication between the interchangeable lens and the camera body to select the calculating formula corresponding to the associated interchangeable lens, to thereby correct the measurement.

In the focal length data inherent to the interchangeable lens, the focal length corresponds to an incident angle $\theta$ of light, and hence, the focal length data is used to eliminate the variation of the measurement of the photometering data caused by the $\cos^4$ law. However, the $\cos^4$ law is applicable only to a lens whose distortion is negligibly small, and thus cannot be applied to a wide-angle lens (fish-eye lens) which has a large distortion. In other words, if an attempt is made to correct the variation of the measurement caused by the $\cos^4$ law, based on the focal length data, in a lens having a distortion which is not negligible, the measurement cannot be appropriately corrected, thus resulting in an error of the photometering data or exposure data, corresponding to the distortion.

The problem with the prior art will be discussed below in more detail, by way of example.

The image surface illuminance ratio for a certain incident angle $\theta$ is given by:

A. in the case of an absence of distortion,
$I\theta/I_o = V \cdot \cos^4\theta$ B. in the case of a presence of distortion,
$I\theta/I_o = V \cdot \cos^4\theta \cdot (1 - f \cdot D' \cdot \tan\theta)/(1+D)^2$ C. in the case of a correction using the focal length data, (note that $\theta = \tan^{-1}(Y/f)$)
$I\theta/I_o = V \cdot \cos^4\{\tan^{-1}(Y/f)\}$ wherein,
$I\theta$: off-axis illuminance
$I_o$: axial illuminance
V: vignetting factor
$\theta$: incident angle
f: focal length
D: distortion
D': $\delta D/\delta Y$
Y: image height If Y=10 mm, V=1.695, $\theta$=68.1476 (degrees), D=−0.5241, and D'=−0.1162, in a fish-eye lens whose focal length f is 8.4 mm (f=8.4 mm), the value of $I\theta/I_o$ is as follows:

A: $I\theta/I_o \approx 0.03$
B: $I\theta/I_o \approx 0.49$
C: $I\theta/I_o \approx 0.29$ In conventional apparatuses, as mentioned above, the focal length data is used to correct the variation of the measurement caused by the $\cos^4$ law. Consequently, the illuminance ratio at the image height of 10 mm (Y=10 mm), obtained by calculation is approximately 0.29 ($I\theta/I_o \approx 0.29$), as indicated at C. However, the actual illuminance ratio at Y=10 mm is approximately 0.49 ($I\theta/I_o \approx 0.49$), as indicated at B. Accordingly, if the illuminance ratio is adjusted using the focal length data, a correct value cannot be obtained. Namely, the calculation results do not correspond to the characteristics of the associated interchangeable lens, and hence, a correct exposure value cannot be obtained.

SUMMARY OF THE INVENTION

It is an object of the present invention to provide a TTL exposure control apparatus for an interchangeable lens camera in which measurements of photometering data can be corrected in accordance with a distortion of each interchangeable lens, even if the interchangeable lens is a wide-angle lens having a significant distortion.

To achieve the object mentioned above, according to an aspect of the present invention, there is provided a TTL exposure control apparatus in an interchangeable lens camera having a camera body to which different interchangeable lenses can be detachably attached and which has a photometering device which measures photometering data using light transmitted through the interchangeable lenses. An exposure correction value corresponding to the distortion of at least one interchangeable wide-angle lens having a distortion is stored in a memory of the interchangeable lens, and the camera body comprises a photometering data correcting device for correcting the measurements by the photometering device in accordance with the exposure correction value read from the memory when the interchangeable wide-angle lens is attached to the camera body.

The distortion of the interchangeable wide-angle lens can be stored alone or as a part of other inherent lens data in the memory of the interchangeable wide-angle lens. If the distortion is included in the inherent lens data, it is not necessary to modify the photometering data correcting device of the camera body. Preferably, the exposure correction value corresponding to the distortion is included in the exposure correction value corresponding to the vignetting factor, since data, such as a focal length, a position of the exit pupil, an open f-number is used for indication, etc.

If only the distortion of the interchangeable wide-angle lens is stored in the memory, the photometering data correcting device of the camera body is preferably comprised of a calculating mechanism for correcting the photometering data in accordance with the exposure correction value.

According to another aspect of the present invention, there is provided a TTL exposure control apparatus having a camera body to which an interchangeable wide-angle lens having a distortion can be detachably attached. The wide-angle lens has a memory for storing an exposure correction value corresponding to the distortion. The camera body comprises a photometering device which measures photometering data using light transmitted through the interchangeable wide-angle lens, and a photometering data correcting device for correcting the measurements by the photometering device in accordance with the exposure correction value read from the memory, when the interchangeable wide-angle lens is attached to the camera body.

According to a further aspect of the present invention there is provided a method for controlling an exposure of an SLR camera having a camera body to which different interchangeable lenses can be detachably attached. The method comprises the steps of storing an exposure correction value corresponding to a distortion of at least one interchangeable wide-angle lens in a memory provided within the interchangeable wide-angle lens, measuring photometering data using light transmitted through the wide-angle interchangeable lens, and correcting the measurements in accordance with the exposure correction value read from the memory.

The present disclosure relates to subject matter contained in Japanese Patent Application No. 7-76307 (filed on Mar. 31, 1995) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
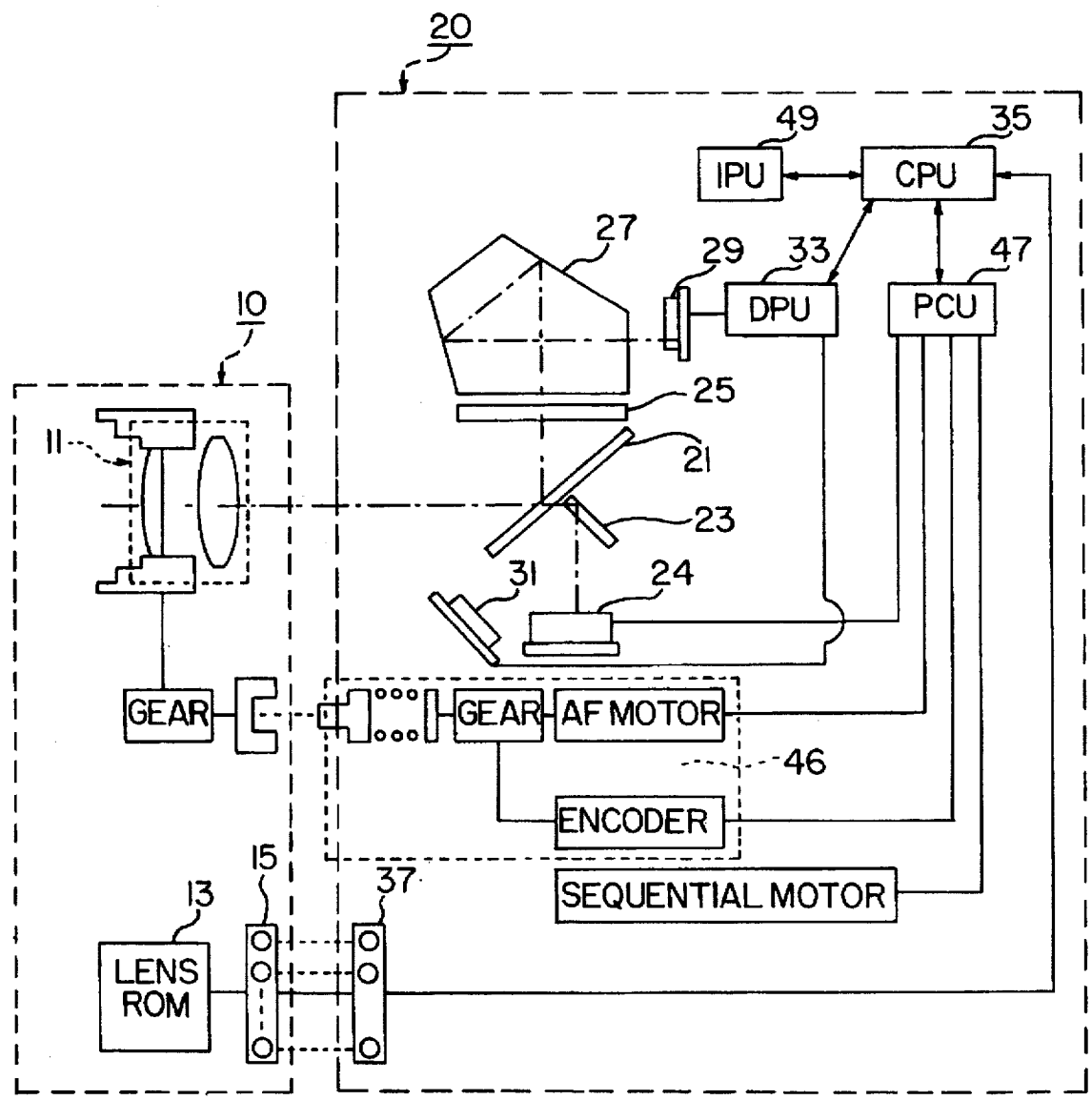
FIG. 1 is a conceptual view of a camera body of a single lens reflex camera and an interchangeable lens, to which the present invention is applied, by way of example.

In FIG. 1, which shows an internal structure of an AF single lens reflex camera, an interchangeable lens 10 is comprised of a photographing optical system 11, a lens ROM 13 which stores therein lens data inherent to the interchangeable lens 10, and a group of electrical contacts 15 which are connected to corresponding electrical contacts 37 provided in a camera body 20 to transmit and receive data to and from the camera body 20.

The camera body 20 includes a main mirror 21, which normally reflects light transmitted through the photographing lens system 11 toward a photometering light receiver 29 through a finder optical system which includes a focusing plate 25 and a pentagonal prism 27. An auxiliary mirror 23 is provided behind the main mirror 21 to reflect light, transmitted through a half mirror portion of the main mirror 21, toward an AF CCD 24. A light receiver 31 is also provided, to detect the illuminance of a film surface when strobe light is emitted, to thereby control the strobe light. The light receivers 29 and 31 are each composed of a split sensor having a plurality of light receiving elements to detect the brightness of an object to be photographed at different image heights.

Figure 2:
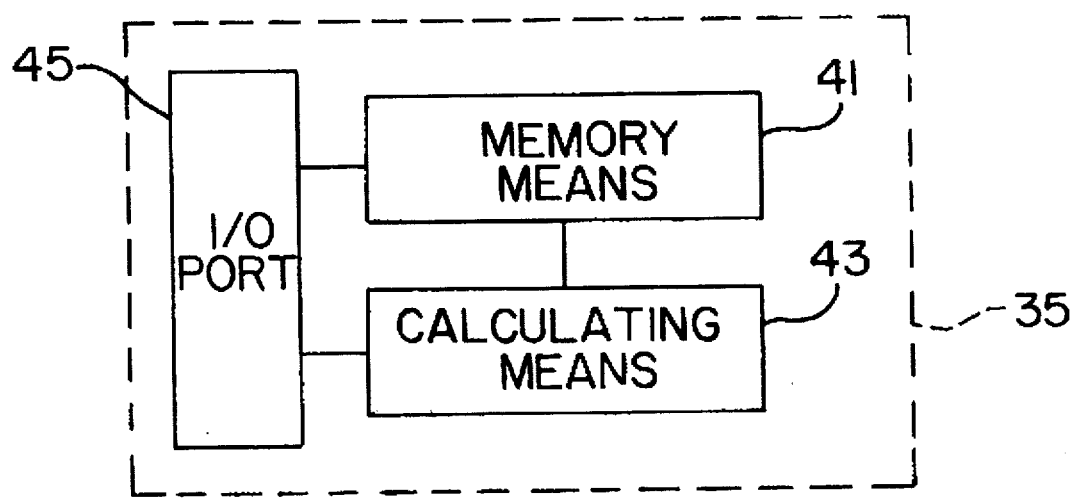
FIG. 2 is a block diagram of an internal structure of a camera body of the single lens reflex camera shown in FIG. 1.

The camera body 20 also includes a microprocessor (DPU) 33 which converts the analogue outputs of the light receivers 29 and 31 into digital signals, and a CPU 35 which performs various arithmetic operations necessary for the photographing operation. Connected to the CPU 35 are the DPU 33, the electrical contacts 37 (which can be connected to the electrical contacts 15 of the interchangeable lens 10), an AF controller (PCU) 47 which controls an AF mechanism 46, and an indication controller (IPU) 49 which controls an indication mechanism, such as an LCD. The CPU 35 also includes memory means 41 and calculating means 43, as shown in FIG. 2. The memory means 41 and the calculating means 43 are connected to the DPU 33, the lens ROM 13, etc., through an I/O (input/output) port 45.

In an interchangeable lens camera as disclosed in the above mentioned JPP '206, photometering data is measured using light transmitted through the photographing optical system 11 and received by the photometering light receiver 29. Upon determining an exposure value, the measurement is corrected in accordance with data inherent to the interchangeable lens 10, such as a focal length, a position of an exit pupil, an open f-number and a vignetting factor, etc. The data inherent to the interchangeable lens 10 is sent to the CPU 35 through the electrical contact groups 15 and 37 and the PCU 47. The CPU 35 stores therein calculating formulae to correct the measurements in accordance with the characteristics of the interchangeable lenses. The CPU 35 identifies the interchangeable lens attached to the camera body, in accordance with the inherent data, and corrects the outputs (measurements) of the light receiver 29, using the calculating formulae in accordance with the inherent data to thereby determine the exposure condition (Tv, Av) based on the measurements.

Figure 3:
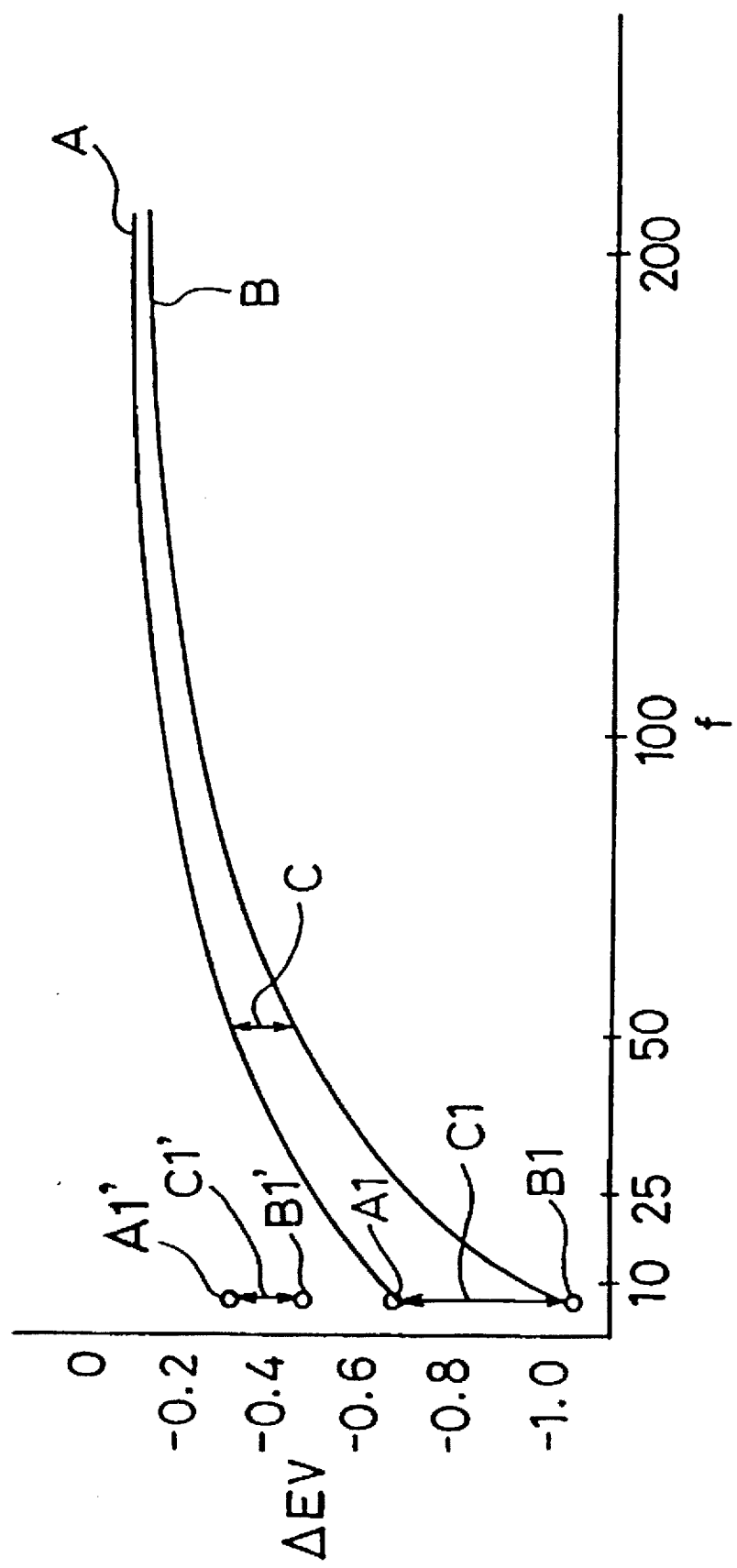
FIG. 3 is a graph showing a relationship between an image surface illuminance and a sensor output with respect to a focal length, by way of example; and, FIG. 4 is a graph showing a relationship between an image surface illuminance and a sensor output with respect to a vignetting factor, by way of example.

FIG. 3 is a graph showing a relationship between a variation "A" of the image surface illuminance and a variation "B" of the output of the light receiver 29, in connection with a variation of the focal length at a certain image height (corresponding to the position of a specific split light receiving element), by way of example, in order to explain the concept of the correction in accordance with the focal length of the interchangeable lens 10. As can clearly be seen in FIG. 3, the difference between the illuminance "A" and the sensor output "B" tends to increase as the focal length decreases. According to the basic concept of the correction for an interchangeable lens camera as disclosed in JPP '206, the difference (correction amount C) is corrected in accordance with the focal length data of the interchangeable lens stored in the ROM 13 thereof, using the calculating formulae stored in the CPU 35 of the camera body 20. However, if the photographing optical system 11 of the interchangeable lens 10 has a considerable distortion, there is a possibility that the illuminance which should be A1 is A1', and the sensor output which should be B1 is B1'. In this state, if the correction amount C1 is applied to the value B1', the difference between C1' (the difference between the values A1' and B1') and the value C1 is an error of the photometering data and accordingly an exposure error.

According to the basic concept of the present invention, the distortion of the photographing optical system 11 of the interchangeable lens 10 is taken into account when the measurements are corrected. There are two aspects of the present invention to realize this.

In the first aspect of the present invention, the calculating formula for the vignetting factor, stored in the CPU 35 of the camera body 20, is used, and an exposure correction value to correct the distortion is added to vignetting factor data which is included in the inherent data of the interchangeable lens stored in the ROM 13 of the interchangeable lens.

In the second aspect of the present invention, the exposure correction data for the distortion is stored in the ROM 13 of the interchangeable lens 10, and the calculating formulae to correct the measurements in accordance with the exposure correction data are stored in the CPU 35 of the camera body 20.

The first aspect of the present invention can be easily realized by only modifying the data of the ROM 13 of the interchangeable lens 10, without modifying the calculating formulae stored in the CPU 35 of the camera body 20 or adding a further calculating formula. The first aspect of the present invention will now be discussed below in more detail.

Figure 4:
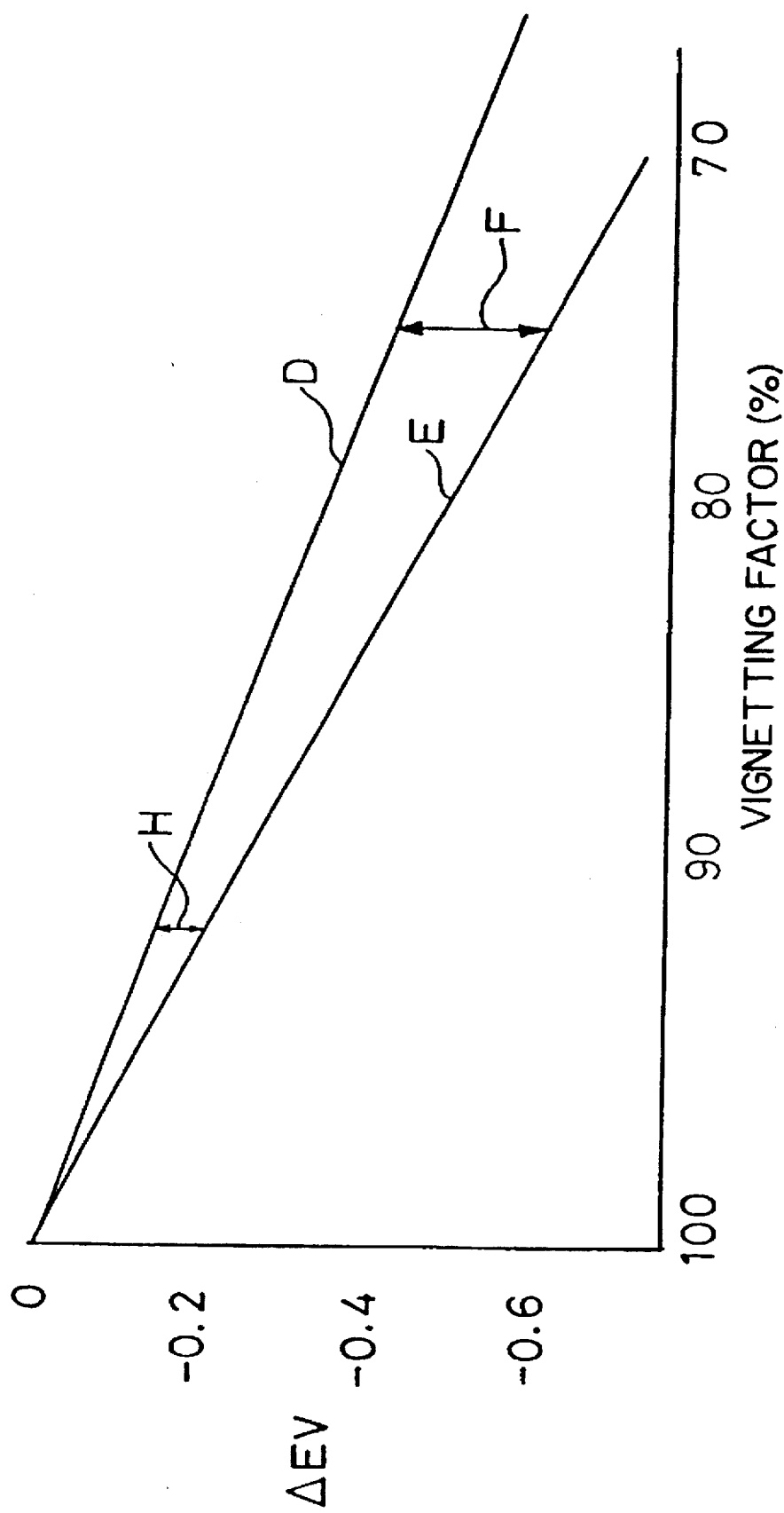

FIG. 4 shows a relationship between a variation D of the actual measurements of illuminance and a variation E of the sensor output of the light receiver 29, in connection with the variation of the vignetting factor at a certain image height, by way of example. In above mentioned JPP '206 the correction amount, corresponding to the variation of the vignetting factor, is stored in the ROM 13 of the interchangeable lens 10, and the calculating formulae, to eliminate the difference (error) F between the sensor output E and the illuminance D, is stored in the CPU 35 of the camera body 20. The variation D of the illuminance is given by:

$$D = \log_2 \text{(vignetting factor} \times 100)$$

According to the first aspect of the present invention, vignetting/distortion correction data is obtained by adding the variation D of the illuminance to the correction amount corresponding to the distortion, and is stored in the ROM 13 of the interchangeable lens 10. The calculating formula stored in the CPU 35 of the camera body 20, for correcting the variation of the vignetting, is used without modifying the same. For instance, if the influence on the correction amount of the photometering data by the distortion is half the influence thereon by the vignetting, the vignetting/distortion data is set to be {(100+vignetting factor)/2}. Namely, since the relationship between the variation of $\Delta \text{Ev}$ and the variation of the vignetting is linear (as shown in FIG. 4), an average value of the vignetting with reference to 100% and the actual vignetting is identical to the vignetting/distortion data.

In FIG. 4, for instance, if the influence component G on the correction amount of the photometering data by the distortion is 0.2 Ev (G=0.2 Ev), the correction amount H of the sensor output E is given by H=F−G, i.e., if F=0.3, H=0.1. In FIG. 4, the value of the vignetting factor, at which the difference between the variation of the illuminance D and the variation of the sensor output E is 0.1 Ev, is obtained. This data is the vignetting/distortion data to be set in the ROM 13.

In the second aspect of the present invention, the exposure correction data for the distortion is obtained and is stored in the ROM 13 of the interchangeable lens 10. The calculating formula using the exposure correction data is stored in the CPU 35 of the camera body 20. For instance, $$mv_5 = a_5 \cdot \text{(distortion)}$$

is used as the calculating formula, so that the correction calculation is achieved by $\Sigma mv$, wherein "$mv_5$" is the correction value corresponding to the distortion, "a" is a coefficient and "$\Sigma mv$" is a correction value which includes at least a correction value corresponding to the distortion. Consequently, the illuminance ratio in case of the presence of distortion, i.e., the formula B $$I\theta/I_o = V \cdot \cos^4\theta \cdot (1 - f \cdot D' \cdot \tan\theta)/(1+D)^2$$

is satisfied.

The disclosure of U.S. Pat. No. 5,012,268, (Hirai), which is a member of the patent family of JP 5-49206, set forth at page 1, is expressly incorporated herein by references in its entirety.

As can be understood from the above discussion, according to the present invention, even if an interchangeable lens having a significant distortion is used, an error of the photometering data caused by the distortion can be corrected so as to obtain a correct exposure value.

What is claimed is:

1. A TTL exposure control apparatus having a camera body to which different interchangeable lenses can be detachably attached, at least one of said interchangeable lenses comprising an interchangeable wide-angle lens having an image surface illuminance ratio beyond a range of applicability of a $\cos^4$ law and having predetermined image distortion, said wide-angle lens having a memory that stores an exposure correction value corresponding to the predetermined image distortion of said wide-angle lens, said camera body comprising a photometering device which measures photometering data using light transmitted through the interchangeable lens; and a photometering data correcting system that corrects the measurements by the photometering device in accordance with the exposure correction value read from the memory when said interchangeable wide-angle lens having predetermined image distortion is attached to the camera body.

2. The TTL exposure control apparatus according to claim 1, wherein the memory of the interchangeable wide-angle lens having predetermined image distortion stores an exposure correction value for a vignetting factor of the interchangeable wide-angle lens having predetermined image distortion, said exposure correction value for the vignetting factor including an exposure factor for the predetermined image distortion of said wide-angle lens.

3. The TTL exposure control apparatus according to claim 1, wherein the memory of the interchangeable wide-angle lens having predetermined image distortion stores an exposure correction value for the distortion for the predetermined image distortion only, and wherein the photometering data correcting system of the camera body comprises a calculating system that corrects the photometering data in accordance with the exposure correction value for the predetermined image distortion of said wide-angle lens.

4. A TTL exposure control apparatus having a camera body to which an interchangeable wide-angle lens having a predetermined image distortion can be detachably attached, said wide-angle lens having predetermined image distortion having a surface image illuminance ratio beyond a range of applicability of a $\cos^4$ law and including a memory that stores an exposure correction value corresponding to the predetermined image distortion of said wide-angle lens, said camera body comprising a photometering device which measures photometering data using light transmitted through the interchangeable wide-angle lens having predetermined image distortion; and a photometering data correcting system that corrects the measurement by the photometering device in accordance with the exposure correction value read from the memory when said interchangeable wide-angle lens having predetermined image distortion is attached to the camera body.

5. A method for controlling an exposure of an SLR camera having a camera body to which different interchangeable lenses can be detachably attached, said method comprising:

storing an exposure correction value corresponding to a distortion of at least one interchangeable wide-angle lens, the interchangeable wide angle lens having a surface image illuminance ratio beyond a range of applicability of a $\cos^4$ law and having predetermined image distortion, in a memory provided within the interchangeable wide-angle lens having predetermined image distortion;

measuring photometering data using light transmitted through the wide-angle interchangeable lens having predetermined image distortion; and correcting the measurements in accordance with the exposure correction value read from the memory.

6. A TTL exposure control apparatus having a camera body to which different interchangeable lenses can be detachably attached, and an interchangeable wide-angle lens having an image surface illuminance ratio beyond a range of applicability of a $\cos^4$ law and having predetermined image distortion, said camera body having a photometering device for photometering by using a bundle of rays transmitted through different interchangeable lenses, said apparatus comprising:

a memory, provided in said interchangeable wide-angle lens having the predetermined image distortion, that stores data on predetermined image distortion inherent to said interchangeable wide-angle lens having predetermined image distortion; and a photometering correction system, provided in said camera body, that corrects a photometering value of said camera body, for correcting a photometering value of said photometering device in accordance with said data on said predetermined image distortion read from said memory when said interchangeable wide-angle lens having a predetermined image distortion is attached to said camera body.

7. The TTL exposure control apparatus according to claim 6, wherein said data on said predetermined image distortion is data for correcting a photometering error caused by an amount of said predetermined image distortion of said interchangeable wide-angle lens having predetermined image distortion.

8. The TTL exposure control apparatus according to claim 7, wherein said data on said distortion is data for correcting a photometering error caused by a vignetting factor and said amount of said predetermined image distortion of said interchangeable wide-angle lens having predetermined image distortion.

9. The TTL exposure control apparatus according to claim 7, wherein said photometering correction system is provided with a calculating system that calculates a photometering correcting value based on said data on said distortion and a photometering value obtained by said photometering device.

10. The TTL exposure control apparatus according to claim 8, wherein said photometering correction system is provided with calculating system that calculates a photometering correcting value based on said data on said distortion and a photometering value obtained by said photometering device.

11. The TTL exposure control apparatus according to claim 1, at least one of said interchangeable lenses detachably attachably to the camera body comprising a lens without predetermined image distortion.

12. The TTL exposure control apparatus according to claim 1, said memory means storing a further exposure correction value corresponding to at least one of focal length, exit pupil position, vignetting factor, and open aperture F number.

13. The TTL exposure control apparatus according to claim 1, said wide-angle lens having predetermined image distortion comprising a fish-eye effect lens.

14. The TTL exposure control apparatus according to claim 1, said photometering data correcting means of the camera body utilizing a defined relationship for calculating a value of the exposure correction value corresponding to the predetermined image distortion.

15. The TTL exposure control apparatus according to claim 1, said photometering data correcting system of said camera body including a plurality of defined relationships for correcting for factors contributing to differences between actual measurements of photometering data and ideal values, one of said defined relationship correcting for said predetermined image distortion of said wide-angle lens.

16. The TTL exposure control apparatus according to claim 1, said photometering data correcting system of the camera body including at least one relationship to compensate for differences between actual measurement of photometering data and ideal values, said at least one relationship being employed for interchangeable lenses not having a predetermined image distortion, and further including a relationship for correction of predetermined image distortion when the interchangeable lens is the wide-angle lens having a predetermined image distortion.

* * * * *

UNITED STATES PATENT AND TRADEMARK OFFICE
CERTIFICATE OF CORRECTION

PATENT NO. : 5,713,053
DATED : January 27, 1998
INVENTOR(S) : Isamu HIRAI

It is certified that error appears in the above-identified patent and that said Letters Patent is hereby corrected as shown below:

At column 8, line 8 (claim 10, line 3) of the printed patent, after "with" insert ---a---.

Signed and Sealed this

Twenty-second Day of September, 1998

Attest:

BRUCE LEHMAN

*Attesting Officer*  *Commissioner of Patents and Trademarks*